United States Patent Office

Re. 25,727

Reissued Feb. 9, 1965

25,727
ORGANOSILOXANE ETHERS

Loren A. Haluska, Midland, Mich., assignor to Dow Corning Corporation, Midland, Mich., a corporation of Michigan No Drawing. Original No. 2,846,458, dated Aug. 5, 1958, Ser. No. 622,011, Nov. 14, 1956. Application for reissue Nov. 30, 1959, Ser. No. 856,324
4 Claims. (Cl. 260—448.2)

Matter enclosed in heavy brackets [ ] appears in the original patent but forms no part of this reissue specification; matter printed in italics indicates the additions made by reissue.

This invention relates to organosilicon compounds having ether linkages in the side chain.

This application is a continuation-in-part of applicant's copending application Serial No. 586,638, filed May 23, 1956, now abandoned.

This invention deals with a modified form of an organosilicon compound which has an oxygenated substitute on the silicon. Due to the oxygenated substituent the organosiloxanes of this invention possess unique properties which have not heretofore been known in organosilicon compounds. Some of the compositions within the scope of this invention are water soluble and unlike most prior water soluble organosilicon compounds they do not hydrolyze upon standing in water solution. In addition, the compositions of this invention have a high degree of alcohol solubility which renders them particularly useful in the cosmetic field.

It is the primary object of this invention to prepare novel organosiloxanes which are useful as surface active agents, release agents, lubricants, antifoam agents and as cosmetic additives. Other objects and advantages will be apparent from the following description.

This invention relates to organosiloxanes having the unit formula $$R'''(OR'')_nOR'\overset{R_a}{Si}O_{\frac{3-a}{2}}$$

in which R is a [monovalent] *monovalent* hydrocarbon radical, R′ is an alkylene radical, R″ is an alkylene radical of at least 2 carbon atoms, R‴ is hydrogen, a saturated hydrocarbon or an aromatic hydrocarbon radical, n is an integer of at least 1 and a has a value from 0 to 2.

The siloxanes of this invention may be prepared by means of two basic reactions. The best method of preparing these siloxanes is reacting an unsaturated ether [or] *of* the formula $R'''(OR'')_nOB$ in which B is an alkenyl radical, with an organosilicon compound containing an SiH group. This reaction is best carried out in the presence of catalysts such as organic peroxides, platinum or chloroplatinic acid. Under the influence of these catalysts the addition of the SiH to the unsaturated B group occurs to give the compositions of this invention.

The organosilicon compounds employed in this reaction can be monomeric hydrolyzable silanes of the formula $$\overset{H}{R_aSi}Y_{3-a}$$

in which Y is a hydrolyzable group such as halogen, alkoxy or the like. After these silanes have been reacted with the unsaturated ether they can then be hydrolyzed in the conventional manner to produce the siloxanes of this invention. Alternatively, the unsaturated ethers can be reacted with siloxanes containing the SiH group. In this case the siloxanes are prepared by a one-step process and no subsequent hydrolysis is needed.

In those cases where R‴ is hydrogen it is preferable to block the hydroxyl group in the unsaturated ether with a triorganosiloxy group (for example, by reaction with a triorganohalosilane) prior to reaction with the organosilicon compound. This blocking prevents side reactions involving the silicon bonded hydrogen or any silicon bonded halogen. After addition of the unsaturated ether to the organosilicon compound has taken place the triorganosiloxy group can be removed by hydrolysis to regenerate the hydroxyl group.

An alternative method of preparing some of the compounds of this invention is that of reacting a hydroxyalkyl organosilicon compound of the formula $$HOR'\overset{R_a}{Si}O_{\frac{3-a}{2}}$$

with an alkylene oxide at temperatures of 70 to 150° C. in the presence of catalysts such as $H_2SO_4$, stannic chloride and $AlCl_3$. Under these conditions reaction of the alkylene oxide with the hydroxy of the hydroxy-alkyl takes place to produce a hydroxyether of the formula $$HOR''OR'\overset{R_a}{Si}O_{\frac{3-a}{2}}$$

This method is particularly adaptable where R′ is a methylene group.

As can be seen from above the organosilicon compounds of this invention can be prepared by reacting any unsaturated ether of the formula $R'''(OR'')_nOB$ with an SiH compound. Thus it can be seen that these ethers can be either monoethers in which R‴ is hydrogen or diethers in which R‴ is a hydrocarbon radical. For the purpose of this invention B can be any alkenyl radical such as vinyl, allyl, hexenyl or octadecenyl. When the B group adds to the silicon it is converted to an alkylene radical of the same number of carbon atoms.

R″ is any alkylene radical of at least 2 carbon atoms such as ethylene, propylene, hexylene or octadecylene, and R‴ can be hydrogen or any saturated aliphatic hydrocarbon radical such as methyl, ethyl, butyl, t-butyl or octadecyl; any saturated cycloaliphatic hydrocarbon radical such as cyclohexyl or cyclopentyl; any aryl hydrocarbon radical such as phenyl, tolyl, naphthyl or xenyl and any aralkyl hydrocarbon radical such as benzyl.

Thus it can be seen that the intermediate ethers which are used in this invention are the monoethers and diethers of glycols and polyglycols. Specific examples of ethers of glycols which are operative herein are those of ethylene glycol, propylene glycol, hexylene glycol and octadecylene glycol. Specific examples of ethers of polyglycols which are operative herein are those of diethylene glycol, tetraethylene glycol, decaethylene glycol, tetrapropylene glycol and dihexylene glycol.

For the purpose of this invention the silicon atom may be substituted with R groups. R can be any monovalent hydrocarbon radical such as alkyl radicals such as methyl, ethyl and octadecyl; cycloaliphatic radicals such as cyclohexyl and cyclopentyl; aryl hydrocarbon radicals such as phenyl, tolyl, xenyl and naphthyl; aralkyl hydrocarbon radicals such as benzyl and unsaturated aliphatic and cycloaliphatic hydrocarbon radicals such as vinyl, allyl, hexenyl and cyclohexenyl.

In those cases where R is an unsaturated nonaromatic hydrocarbon radical it is preferable that the compounds be prepared by reaction of an alkylene oxide with the corresponding hydroxyalkyl silicon compound described above. It is to be understood, however, that it is not imperative that this method be employed although such a method avoids undesirable side reactions which may occur by adding an unsaturated ether to a silicon compound containing an unsaturated aliphatic hydrocarbon radical.

This invention also relates to copolymers containing from .1 to 99.9 mol percent siloxane units of the formula $$R'''(OR'')_nOR'\overset{R_a}{Si}O_{\frac{3-a}{2}}$$

in which R''', R'', n, R', R and a are as above-defined and from .1 to 99.9 mol percent siloxane units of the formula $$Z_bSiO_{\frac{4-b}{2}}$$

in which Z is of the group monovalent hydrocarbon radicals and halogenated monovalent hydrocarbon radicals and b has an average value from 1 to 3 inclusive.

These copolymers can be prepared by the cohydrolysis of the corresponding hydrolyzable silanes of the formula $$R'''(OR'')_nOR'\overset{R_a}{Si}Y_{3-a}$$

and $$Z_bSiY_{4-b}$$

in which Y is a hydrolyzable group. This hydrolysis can be carried out in the conventional manner for cohydrolyzing hydrolyzable silanes. Alternatively, the copolymers of this invention can be prepared directly by reacting the above-defined unsaturated ethers with copolymers containing silicon bonded hydrogen in some of the siloxane units. This reaction is carried out in an identical manner as described above.

The copolymers of this invention can contain the following types of siloxane units: $ZSiO_{3/2}$, $Z_2SiO$, $Z_3SiO_{.5}$ and limited amounts of $SiO_2$ units. For the purpose of this invention Z can be any monovalent hydrocarbon radical such as alkyl radicals such as methyl, ethyl, hexyl and octadecyl; alkenyl radicals such as vinyl, allyl and hexenyl; cycloaliphatic radicals such as cyclohexyl, cyclopentyl and cyclohexenyl; aralkyl hydrocarbon radicals such as benzyl and aryl hydrocarbons radicals such as phenyl, tolyl, xenyl and naphthyl. Z can also be any halogenated hydrocarbon radical such as chloromethyl, tetrafluoroethyl, trifluorovinyl, tetrafluorocyclobutyl, chlorodifluorovinyl, α,α,α-trifluorotolyl, bromophenyl and tetrabromoxenyl.

The compositions of this invention are unique in their properties because they have in the molecule both a hydrophilic and a hydrophobic portion. As a result when the hydrophilic portion is present in sufficient amount the materials are water soluble. In general it has been found that the compositions of this invention are water soluble even when as much as 30 mol percent of the total siloxane units are of the formula $$Z_bSiO_{\frac{4-b}{2}}$$

Alcohol solubility is obtained with much higher percentages of the latter siloxane units. Because of the dual nature of the molecules of the compositions of this invention they are useful for emulsifying agents and for antifoaming agents.

In addition the water solubility of these materials renders them particularly useful for release agents. Prior to this invention organosilicon release agents were sold primarily in the form of aqueous emulsions. Emulsions tend to break from one cause or another and consequently are not as satisfactory as aqueous solutions. Prior to this invention the only satisfactory siloxane release agents in the water soluble class were those in which the water solubilizing group was hydrolyzable. As a result when these were placed in solution and allowed to stand the siloxane invariably oiled out due to the hydrolysis of the solubilizing group. This of course prevents any widespread commercial use of this type of material.

The present materials, however, are water soluble but do not hydrolyze on standing because the solubilizing group is connected to the silicon by a silicon-carbon linkage which is stable to hydrolysis. Thus the materials of this invention avoid the difficulties which have been encountered with previously known siloxane release agents.

In addition the siloxanes of this invention, both homopolymers and copolymers, are useful as lubricants and give far superior lubricity to conventional siloxanes.

The following examples are illustrative only and should not be construed as limiting the invention which is properly delineated in the appended claims.

EXAMPLE 1

509 g. of $CH_2{=}CH_2CH_2O(CH_2CH_2O)_{8.8}CH_2CH_2OH$ (hereinafter referred to as polyglycol A) was reacted with 130.2 g. of trimethylchlorosilane by heating a mixture of the two for 2 hours to a temperature of 88° C. This was done to block the hydroxyl groups with trimethylsiloxy groups.

The resulting product was mixed with 2 g. of a 1% ethanol solution of chloroplatinic acid and 60.1 g. of a trimethyl end-blocked methylhydrogensiloxane having a viscosity of about 20 cs. The mixture was heated at 151° C. until the solution become homogeneous. It was then cooled to 130° C. and heated for an additional hour.

The product was then mixed with 16.3 g. of 5% hydrochloric acid and heated at from 106 to 124° C. for 1 hour to remove the trimethylsiloxy groups from the glycol side chain. The product was neutralized with sodium bicarbonate, filtered and then stripped by heating at 50° C. at 13 mm. to remove low boiling products.

The resulting product had a viscosity at 25° C. of 204 cs., an $n_D^{25}$ of 1.4595 and a freezing point of 1° C. This material had the formula $$Me_3SiO[\underset{Me}{Si}O(CH_2)_3O(CH_2CH_2O)_{8.8}(CH_2)_2OH]_xSiMe_3$$

This material was water soluble and was a good antifoam agent for ethylene glycol antifreeze solutions.

EXAMPLE 2

509 g. of polyglycol A and 129 g. of dimethyldichlorosilane were heated at 102° C. for 30 minutes. 2 g. of a 1% ethanol solution of chloroplatinic acid and 60.1 g. of $(MeHSiO)_4$ were then added and the mixture was heated at 120° C. for 48 minutes. The product was hydrolyzed by heating with aqueous HCl and then neutralized with sodium bicarbonate and filtered. The resulting product was heated at 50° C. at 13 mm. to remove the dimethylsiloxane formed during the hydrolysis. The resulting product was heated at 50° C. at 13 mm. to remove the dimethylsiloxane formed during the hydrolysis. The resulting fluid had a viscosity at 25° C. of 455 cs., an $n_D^{25}$ of 1.4555 and a freezing point of 1° C. and had the unit formula $$MeSi\overset{O}{(}CH_2)_3O(CH_2CH_2O)_{8.8}OCH_2CH_2OH$$

This material was useful as an antifoam agent for ethylene glycol antifreeze solutions.

EXAMPLE 3

509 g. of polyglycol A were mixed with 162.9 g. of trimethylchlorosilane and refluxed 2 hours at 55 to 67° C. The product was mixed with 1 g. of a 1% ethanol solution of chloroplatinic acid, 200 cc. of dry toluene and 135.3 g. of $$HMe_2SiO\underset{Me}{\overset{Ph}{Si}}OSiMe_2H$$

The mixture was heated at 81 to 100° C. for ½ hour. The excess trimethylchlorosilane and some toluene were removed by distillation and 38 g. of 2% HCl was added to the residue. The mixture was heated at 95 to 110° C. for 11½ hours. The material was then stripped by heating up to 177° C. and the residue was neutralized with sodium bicarbonate, filtered and further heated to 102° C. at 3 mm. pressure. The residue had a viscosity at 25° C. of 69 cs. and a refractive index of 1.4641. This material had the formula $$HO(CH_2)_2(OCH_2CH_2)_{8.3}O(CH_2)_3\overset{Me_2}{Si}O\overset{Ph}{Si}O\overset{Me_2}{Si}(CH_2)_3O(CH_2CH_2O)_{8.8}(CH_2)_2OH$$
$$Me$$

EXAMPLE 4

A mixture of 320.4 g. of the ethylvinylether of diethylene glycol, 200 ml. of toluene, 134.3 g. of tetramethyldisiloxane and 1 g. of a 1% ethanol solution of chloroplatinic acid was refluxed at 90 to 117° C. for 8 hours. The resulting product was distilled to give the compound $$[EtO(CH_2CH_2O)_2CH_2CH_2\overset{Me_2}{Si}]_2O$$

boiling 170 to 171° C. at .4 mm. and having the following properties, a specific gravity at 25° C. of .963, a viscosity at 25° C. of 6.82 cs. and an $n_D^{25}$ of 1.4337.

This fluid was tested on a Shell four-ball wear tester employing 52–100 standard steel balls at 275° F. at 1200 r.p.m. When the load was 4 kg. the scar diameter was .77 mm. When the load was 40 kg. the scar diameter was .93 mm. This shows far superior lubricity at the higher load to conventional siloxanes.

EXAMPLE 5

337 g. of the vinylmethylether of ethylene glycol was mixed with 200 ml. of toluene, 201.5 g. of tetramethyldisiloxane and 1 g. of a 1% ethanol solution of chloroplatinic acid and heated at 84 to 92° C. for 7 hours. The resulting product was distilled to give 200 g. of the compound $$[MeOCH_2CH_2OCH_2CH_2\overset{Me_2}{Si}]_2O$$

having the following properties: boiling point 111.5° C. at 1 mm., specific gravity at 25° C. of 0.945, viscosity at 25° C. of 3.4 cs. and an $n_D^{25}$ of 1.4299.

EXAMPLE 6

A mixture of 223 g. of the monoallylether of diethylene glycol and 54.3 g. of trimethylchlorosilane was heated at 58–68° C. for 2½ hours. The product was mixed with 130 g. of a siloxane of the average molecular formula $$H\overset{Me_2}{Si}O(\overset{Me_2}{Si}O)_{21.2}\overset{Me_2}{Si}H$$

125 ml. of toluene and 1 g. of a .35% dimethyl carbitol solution of chloroplatinic acid and heated at 93 to 106.5° C. for 6 hours. Some of the toluene and the excess trimethylchlorosilane were distilled off. 20 ml. of 12% HCl were then added and the mixture was heated for 2 hours at 95° C. The remaining toluene and water were distilled off, the product neutralized with sodium bicarbonate, filtered and then stripped by heating to 150° C. at 1.5 mm. The resulting product had the average molecular formula $$H(OCH_2CH_2)_2O(CH_2)_3\overset{Me_2}{Si}[O\overset{Me_2}{Si}]_{21.2}O\overset{Me_2}{Si}(CH_2)_3O(CH_2CH_2O)_2H$$

and the following properties: viscosity at 25° C. of 43.8 cs. and an $n_D^{25}$ of 1.4095.

EXAMPLE 7

When 1 mol of the vinylmethylether of ethylene glycol is reacted with 1 mol of trichlorosilane in the presence of 1 g. of a .35% dimethyl carbitol solution of chloroplatinic acid at a temperature of 125° C. in an autoclave for 4 hours and the resulting product is hydrolyzed, a resinous polysiloxane of the unit formula $$MeOCH_2CH_2OCH_2CH_2SiO_{3/2}$$

is obtained.

EXAMPLE 8

When the methylvinylether of ethylene glycol is reacted with phenyldichlorosilane in accordance with the procedure of Example 7 and the resulting product is hydrolyzed, a fluid siloxane of the unit formula $$MeOCH_2CH_2OCH_2CH_2\overset{Ph}{Si}O$$

is obtained.

EXAMPLE 9

When an equimolar mixture of $$CH_2{=}CHCH_2O(CH_2CH_2O)_{9.8}SiMe_3$$

and ethyldichlorosilane is heated at 120° C. for four hours in the presence of 1 g. of a .35% solution of chloroplatinic acid in diethylcarbitol, the compound $$Cl_2\overset{Et}{Si}(CH_2)_3O(CH_2CH_2O)_{9.8}SiMe_3$$

is obtained.

When 50 mol percent of this chlorosilane is cohydrolyzed with 10 mol percent monomethyltrichlorosilane, 10 mol percent chlorophenyltrichlorosilane, 10 mol percent monovinyltrichlorosilane and 20 mol percent phenyltrichlorosilane, a resinous siloxane having the composition 50 mol percent $$H(OCH_2CH_2)_{9.8}O(CH_2)_3\overset{Et}{Si}O$$

10 mol percent $MeSiO_{3/2}$, 10 mol percent $ClC_6H_4SiO_{3/2}$, 10 mol percent $CH_2{=}CHSiO_{3/2}$ and 20 mol percent $PhSiO_{3/2}$ is obtained.

EXAMPLE 10

The following siloxanes are obtained when the following ethers are reacted with tetramethyldisiloxane in accordance with the procedure of Example 4.

| Ether | Siloxane |
|---|---|
| $PhO(CH_2)_6O(CH_2)_{16}CH{=}CH_2$ | $[PhO(CH_2)_6O(CH_2)_{16}\overset{Me_2}{Si}]_2O$ |
| $PhCH_2O\overset{Me}{C}HCH_2OCH{=}CH_2$ | $[PhCH_2O\overset{Me}{C}HCH_2O(CH_2)_2\overset{Me_2}{Si}]_2O$ |
| $CH_3C_6H_4[OCH_2CH_2]_3OCH_2CH{=}CH_2$ | $[CH_3C_6H_4(OCH_2CH_2)_3O(CH_2)_3\overset{Me_2}{Si}]_2O$ |

EXAMPLE 11

When 1 mol of hydroxypropylvinylsiloxane is reacted with 1 mol of ethylene oxide by heating a mixture of the two at 120° C. in the presence of 1 g. of $SnCl_4$, a fluid siloxane having the unit formula $$HO(CH_2)_2O(CH_2)_3\overset{CH{=}CH_2}{Si}O$$

is obtained.

EXAMPLE 12

A mixture of 196.8 g. of the allylmethylether of ethylene glycol, 96.2 g. of a 25 cs. trimethyl end blocked methylhydrogenpolysiloxane fluid, 200 ml. of dry toluene and 3 g. of a solution of chloroplatinic acid in ie dimethyl ether of diethylene glycol, said solution ontaining .14% by weight Pt, was heated at 109 to 118° :. for 4 hours and 21 minutes. The product was then eated to 215° C. at 2 mm. to remove low boiling ma- erials. The residue was a fluid of 3000 cs. viscosity at 5° C. having an index of refraction of 1.4481 at 25° C. This fluid had the formula $$Me_3SiO[\underset{Me}{Si}O\underset{CH_2CH_2CH_2O\,CH_2CH_2OMe}{}]_xSiMe_3$$

EXAMPLE 13

A mixture of 588 g. of $$CH_2{=}CHCH_2O(CH_2CH_2O)_{12}H$$

and 162.9 g. of $Me_3SiCl$ was heated for 4 hours and 10 minutes at from 67 to 102° C. The product was cooled to room temeprature and 210.4 g. of $PhMe_2SiOSiMe_2H$, 4 g. of the platinum catalyst of Example 12 and 400 ml. of toluene were added. The resulting mixture was heated at 92 to 118° C. for 7 hours. The unreacted $Me_3SiCl$ and toluene were removed and the product was hydrolyzed with 27 g. of 2% HCl solution by heating at 95° C. for 2 hours. The product was neutralized with $NaHCO_3$, cooled and filtered. The product was heated to 107° C. at 2 mm. to remove volatile materials. The residue was a fluid having the formula $$PhMe_2SiO\overset{Me_2}{Si}CH_2CH_2CH_2O(CH_2CH_2O)_{12}H$$

and the following properties: viscosity 40 cs. at 25° C. and $n_D^{25}$ 1.4605. This material was a good emulsifying agent for aqueous emulsions of phenylmethyl siloxanes.

EXAMPLE 14

When the following glycol ethers are reacted with the following siloxanes and the products hydrolyzed in accordance with the procedure of Example 13, the following products are obtained.

That which is claimed is:

1. A siloxane of the unit formula $$R'''(OR'')_nOR'\overset{R_a}{Si}O_{\frac{3-a}{2}}$$

in which R is a monovalent hydrocarbon radical, R′ is an alkylene radical, R″ is an alkylene radical of at least 2 carbon atoms, n is an integer of at least 1, R‴ is selected from the group consisting of hydrogen, saturated hydrocarbon radicals and aryl hydrocarbon radicals and a has a value from 0 to 2 inclusive.

2. A composition in accordance with claim 1 where R is a methyl radical.

3. A copolymeric siloxane composed of from .1 to 99.9 mol percent siloxane units of the formula $$R'''(OR'')_nOR'\overset{R_a}{Si}O_{\frac{3-a}{2}}$$

in which R is a monovalent hydrocarbon radical, R′ is an alkylene radical, R″ is an alkylene radical of at least 2 carbon atoms, n is an integer of at least [2] *1*, R‴ is selected from the group consisting of hydrogen, saturated hydrocarbon radicals and aryl hydrocarbon radicals and a has a value from 0 to 2 inclusive and from .1 to 99.9 mol percent siloxane units of the formula $$Z_bSiO_{\frac{4-b}{2}}$$

in which Z is selected from the group consisting of monovalent hydrocarbon radicals and halogenated monovalent hydrocarbon radicals and b has an average value from 1 to 3 inclusive.

4. A copolymer in accordance with claim 3 in which both R and Z are methyl radicals.

| Glycol Ether | Siloxane | Product |
|---|---|---|
| $CH_2{=}CHCH_2O(CH_2CH_2O)_2SiMe_3$ | $C_{18}H_{37}\overset{Me_2}{Si}O\overset{Me_2}{Si}H$ | $C_{18}H_{37}\overset{Me_2}{Si}O\overset{Me_2}{Si}CH_2CH_2CH_2O(CH_2CH_2O)_2H$ |
| $CH_2{=}CHCH_2O(CH_2CH_2O)_2SiMe_3$ | $C_{16}H_{33}\overset{Me_2}{Si}O\overset{Me_2}{Si}H$ | $C_{16}H_{33}\overset{Me_2}{Si}O\overset{Me_2}{Si}CH_2CH_2CH_2O(CH_2CH_2O)_2H$ |
| $CH_2{=}CHCH_2O(CH_2CH_2O)_{12}SiMe_3$ | $C_8H_{17}$ 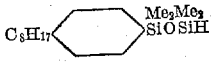 | $C_8H_{17}$ 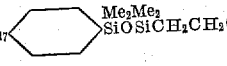 |

References Cited by the Examiner

The following references, cited by the Examiner, are of record in the patented file of this patent or the original patent.

UNITED STATES PATENTS

| | | | |
|---|---|---|---|
| 2,476,307 | 7/49 | Klein et al. | 260—448.2 |
| 2,584,751 | 2/52 | Speier | 260—448.2 |
| 2,721,873 | 10/55 | MacKenzie et al. | 260—448.2 |

FOREIGN PATENTS

| | | |
|---|---|---|
| 1,118,495 | 3/56 | France. |

TOBIAS E. LEVOW, *Primary Examiner.*

ALPHONSO D. SULLIVAN, *Examiner.*